(12) United States Patent
Lim et al.

(10) Patent No.: US 6,446,954 B1
(45) Date of Patent: Sep. 10, 2002

(54) METHOD AND APPARATUS FOR END-TO-END FEEDING OF SHEET MEDIA

(75) Inventors: Kian Soon Lim; Cher Lam Lim, both of Singapore (SG)

(73) Assignee: Hewlett-Packard Company, Palo Alto, CA (US)

( * ) Notice: Subject to any disclaimer, the term of this patent is extended or adjusted under 35 U.S.C. 154(b) by 100 days.

(21) Appl. No.: 09/671,663

(22) Filed: Sep. 27, 2000

(51) Int. Cl.[7] .............................. B65H 5/06; H04N 1/12
(52) U.S. Cl. ................... 271/10.04; 271/266; 271/902; 358/498
(58) Field of Search .............................. 271/4.04, 10.04, 271/225, 226, 902; 358/498

(56) References Cited

U.S. PATENT DOCUMENTS

| | | | | |
|---|---|---|---|---|
| 5,155,603 A | * | 10/1992 | Seok-Jae | 271/265.02 |
| 5,805,310 A | * | 9/1998 | Jean et al. | 271/10.04 |
| 5,823,523 A | * | 10/1998 | Park | 271/10.04 |
| 5,854,696 A | * | 12/1998 | Yun | 271/10.04 |
| 6,005,687 A | * | 12/1999 | Kawashima et al. | 271/10.11 |

* cited by examiner

Primary Examiner—Christopher P. Ellis
Assistant Examiner—Mark A. Deuble

(57) ABSTRACT

A method and apparatus for end-to-end advancement of sheet media in an automatic document feeder suitable for use with a scanner are disclosed. The method involves driving a drive roller in a forward direction to advance a sheet medium section-by-section at a substantially uniform speed across a scan zone of the scanner. Such driving involves accelerating the sheet medium to reach the uniform speed, maintaining the speed while a section is scanned, decelerating the sheet medium to a stop after the section is scanned and reversing the sheet medium by a predetermined distance to allow it to be subsequently accelerated. To prevent an overlap of sheet media during such back and forth advancement of a sheet medium, a pick roller is prevented from reversing when the drive roller is reversed. When the drive roller is driven in the forward direction, the pick roller is only driven after a predetermined delay.

18 Claims, 4 Drawing Sheets

METHOD AND APPARATUS FOR END-TO-END FEEDING OF SHEET MEDIA

FIELD OF INVENTION

This invention relates to a subsystem in an automatic document feeder for feeding of sheet media. More particularly, this invention relates to a subsystem in an automatic document feeder suitable for use with a scanner wherein a scanned sheet is moved back and forth during scanning.

BACKGROUND

The throughput of office equipment such as photocopiers, scanners and fax machines is measured by the number of sheet media that can be processed by these equipment. One factor that determines the throughput of these equipment is the throughput of an automatic document feeder that is usually attached to these equipment for feeding sheet media to these equipment for processing. The throughput of the automatic document feeder should be as high as that of the equipment so as to make the most efficient use of the equipment.

Currently, the throughput of some scanners is limited by the throughput of an automatic document feeder that is attached to the scanners. In these scanners, the complicated back and forth transportation of sheet medium allows sheet media to be processed only one at a time. The automatic document feeder is designed to be able to pick and feed a new sheet medium only after the preceding sheet medium is fed through to the end of a document path. Such a method of sheet processing is inefficient and greatly limits the throughput of the document feeder. End-to-end feeding of the sheets is used in higher-end scanners to increase throughput. In end-to-end feeding, as soon as a sheet medium leaves a media tray, the next topmost sheet medium is picked and advanced to closely follow the preceding sheet medium.

Such end-to-end feeding of sheet media is easily accomplished in the high-end scanners. These high-end scanners usually have an abundance of memory for capturing scanned image of an entire sheet medium in one continuous pass of the sheet medium. However, low-cost units do not have the luxury of such a large memory. To completely capture the image on a sheet medium, each sheet medium is divided into contiguous sections. The size of each section is determined by the amount of available memory in the units. Each section of the sheet medium is separately scanned and the data of the scanned image on the section is stored in the available memory for uploading to a computer. Once the data in the memory is uploaded, the memory becomes available to capture another set of data.

The quality of a scanned sheet depends on several factors, one of which is the speed at which the sheet medium is passed over a scan zone of a scanner. To achieve a higher quality scanned image, the sheet medium is advanced over the scan zone at a uniform speed. In order to get a subsequent section across the scan zone at a uniform speed after a section is scanned, the sheet medium will have to be retracted, or reversed, in the document path. This reversing of sheet medium is required to allow the sheet medium to be accelerated to reach the uniform speed when the subsequent section reaches the scan zone. Such forwarding and reversing of a sheet medium poses a challenge in the picking and advancing of the sheet medium in a low-cost document feeder as illustrated in FIGS. 1A and 1B.

FIGS. 1A and 1B show a media feed subsystem 2 of an automatic document feeder wherein a single motor (not shown) is used to drive both a pick roller 4 and a drive roller 6. The motor drives a main gear 8, which in turn drives the pick and drive rollers 4, 6 via free gears, generally illustrated in the figures as free gears 10, 12. FIG. 1A shows that the main gear 8 being driven in a counterclockwise direction to advance a first sheet medium 14 in a forward direction as indicated by arrow F. The first sheet medium 14 is shown to have been advanced beyond the pick roller 4. Using an appropriate gear ratio the drive roller 6 is driven faster than the pick roller 4 to create a gap 16 between a trailing edge 18 of the first sheet medium 14 and the leading edge of a second sheet medium 20. FIG. 1A shows the second sheet medium 20 being urged against the pick roller 4 for picking. Driving the main gear to reverse the drive roller 6 would also cause pick roller 4 to reverse. This reversing of the pick roller 4 would push the second sheet medium 20 away from under the pick roller 4 as shown in FIG. 1B. There is thus a tendency during subsequent forwarding of the pick roller 4 that a third sheet medium is pick in place of the second sheet medium, thereby disrupting the sequence of media feeding.

This problem is solved by the introduction of a slip clutch (not shown) that is attached to a shaft (not shown) of the pick roller 4 to allow unidirectional rotation of the pick roller 4. FIG. 2A shows a subsystem similar to that in FIGS. 1A and 1B with the addition of such a slip clutch. When the drive roller 6 is reversed, the slip clutch prevents the pick roller 4 from rotating in the reverse direction so that the pick roller 4 continues to bear upon the second sheet medium 20. This solution creates another problem. As the drive roller 6 and pick roller 4 are driven in the forward direction, there is a tendency for the two sheet media 14, 20 to overlap if the first sheet medium 14 is reversed by a amount that the differential in speeds of the two rollers 4, 6 cannot correct. The overlapping of sheet media is unacceptable because image on the overlapped portion cannot be scanned and the scanner is also unable to easily identify the sheet media boundaries. The pre-selection of gear ratio to ensure a speed differential to cater to the worst case scenario would compromise throughput as the gap between two sheet media could be large.

The prior art therefore creates the need for a method and apparatus for sequencing sheet media to increase throughput in a scanner or the like without increasing the cost of prior art apparatus excessively.

SUMMARY

In one aspect of the present invention, a method of driving a sheet media feed subsystem for substantially end-to-end advancement of sheet media in an automatic document feeder suitable for use with a scanner involves driving a drive roller to advance a sheet medium section-by-section across a scan zone of the scanner. In advancing a section of the sheet medium across the scan zone, the method involves accelerating the drive roller in a forward direction to attain a substantially uniform speed when the section reaches the scan zone. Thereafter, the drive roller is driven at the substantially uniform speed to advance the section across the scan zone. When the section is scanned, the drive roller is decelerated to bring the drive roller to a stop. The drive roller is then reversed to reverse the sheet medium by a predetermined distance so as to allow the drive roller to be subsequently accelerated to bring a next section to the substantially uniform speed when the next section reaches the scan zone. As the drive roller is reversed, a pick roller is prevented from reversing. As the drive roller is driven in the forward direction following a reversed rotation, the pick roller is similarly driven in the forward direction after a predetermined period. When a preceding sheet medium leaves the pick roller, the pick roller picks and advances a next sheet medium to follow the preceding sheet medium closely to leave a gap between the two sheet media. The delay in driving the pick roller prevents overlapping of the two sheet media.

In another aspect of the present invention, a media feed subsystem according to a preferred embodiment that is suitable for implementing the method above has a drive roller, a pick roller, a slip clutch and a drive system. The drive and pick rollers are driven by the drive system according to the method above. The slip clutch allows the pick roller to be driven in a single direction and prevents the pick roller from reversing when the drive roller is reversed. The drive system includes a delay mechanism that allows the pick roller to be driven after the drive roller is driven forward for a predetermined period following the reversing of the drive roller.

Preferably, the drive system includes a single motor that drives the pick roller and the drive roller via a gear train. The delay mechanism preferably includes a delay gear for driving the pick roller. This delay gear is attached to a second shaft to allow the second shaft to rotate in one direction to engageably drive the delay gear and to rotate in the other direction to disengage the delay gear to delay its driving by the predetermined period.

Preferably, the delay gear has an aperture for receiving the second shaft. The delay gear has a gap defined therein for receiving a stub that is fixedly attached to the second shaft. The movement of the stub within the gap allows the second shaft to be rotated without rotating the delay gear. However, when the second shaft is rotated to allow the stub to engage a wall that defines the gap, further rotation of the second shaft will also cause the delay gear to rotate.

BRIEF DESCRIPTION OF DRAWINGS

The invention will be better understood with reference to the drawings, in which:

FIG. 1A shows the rollers being driven in a forward direction to advance and pick a first sheet medium and a second sheet medium respectively. FIG. 1B shows the rollers being driven in a reverse direction to cause the first sheet medium to be reversed. The second sheet medium is shown to be pushed away from under the pick roller.

FIG. 2A shows a warped first sheet medium between the pick and drive rollers. FIG. 2B shows overlapping of two sheet media when the pick and drive rollers are driven in the forward direction after the reversing action of the drive roller in FIG. 2A.

FIG. 3A shows the drive roller being driven at a faster speed than the pick roller to introduce a gap between a first and a second sheet medium. FIG. 3A also shows a shaft of the delay gear having a stub that engages a wall of the delay gear to drive the delay gear.

FIG. 3B shows that when the driver roller is reversed, the delay gear shaft is rotated to disengage the stub from the wall of the delay gear so that the delay gear and pick roller remain stationary.

FIG. 3C shows that when the drive roller is again driven in the forward direction after the reverse rotation shown in FIG. 3B, the pick roller remains stationary until the stub has been rotated to again engage the wall of the delay gear. This delay in driving the pick roller allows the drive roller to advance the first sheet medium to restore the gap between the first and second sheet medium.

FIGS. 3D and 3E show that as the pick and drive rollers are further driven in the forward direction, the gap between the first and second sheet medium widens.

FIG. 3F is similar to FIG. 3B showing the drive roller being driven in the reverse direction. FIG. 3F however shows an overlap of two sheet media in a portion of the document path between the pick and drive rollers.

FIG. 3G is similar to FIG. 3C showing the gap in FIG. 3E restored after the drive roller is driven in the forward direction subsequent to the reverse rotation as shown in FIG. 3F.

FIG. 3H shows a maximum gap that is attained between two sheet media when the second sheet medium reaches the drive roller.

DETAILED DESCRIPTION OF THE PREFERRED EMBODIMENT

Figure 1A:
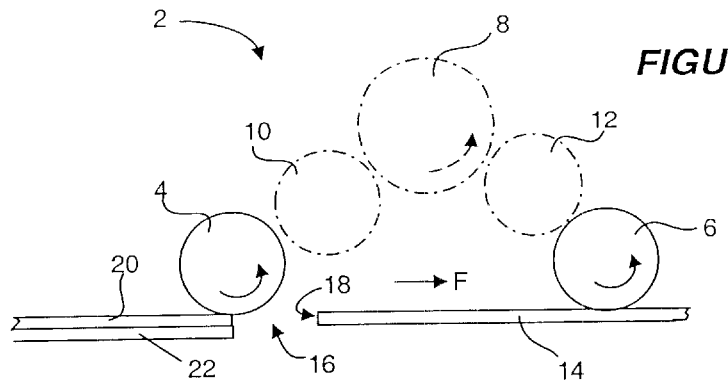
FIGS. 1A and 1B are side views of a prior art pick roller, drive roller and associated gear train for driving the pick and drive rollers.
Figure 1B:
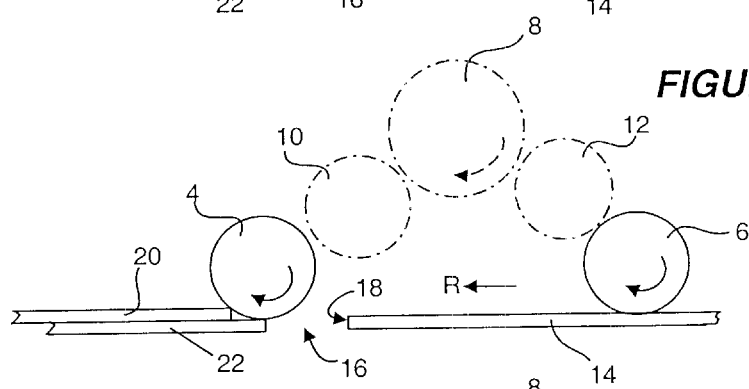
Figure 2A:
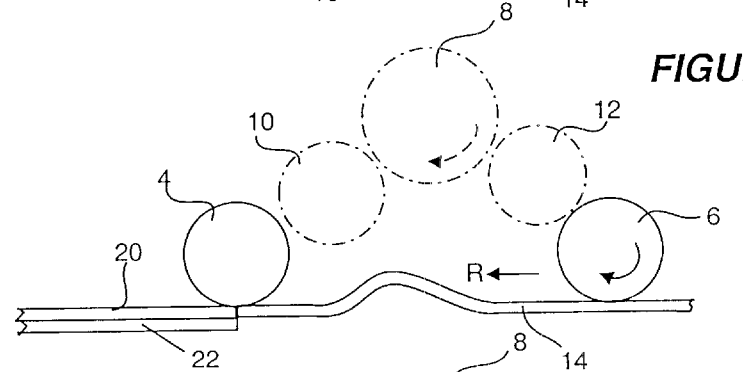
FIGS. 2A and 2B are side views similar to FIGS. 1A and 1B except the pick roller is prevented from rotating in the reverse direction by a slip clutch (not shown) to hold the second sheet medium under the pick roller.
Figure 2B:
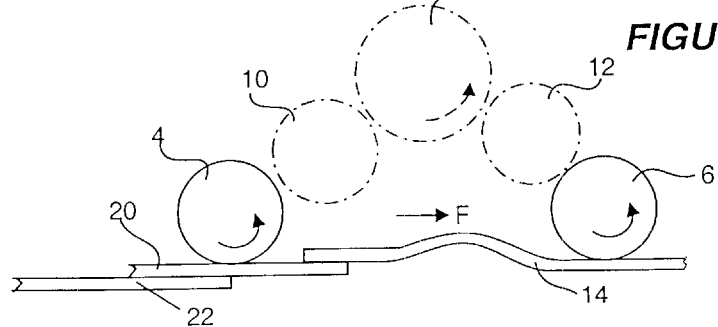
Figure 3A:
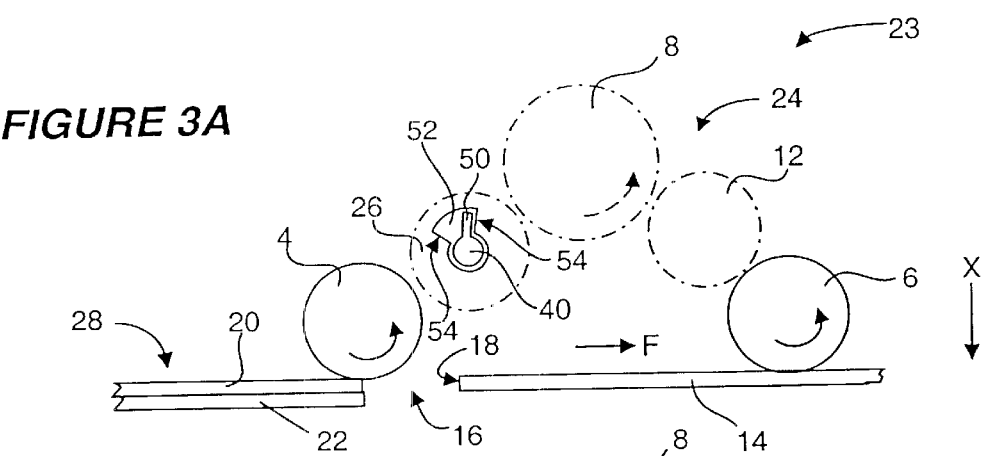
FIGS. 3A–3H are side views similar to FIGS. 2A and 2B illustrating the sequence of driving a pick roller and a drive roller according to the present invention. These figures show an example of a mechanism, in this case a delay gear, which can be used to delay the driving of the pick roller after the drive roller is driven in a forward direction following a reverse rotation. The delay is proportional to the angular distance covered in the reverse rotation of the drive roller.

FIG. 3A is a side view of an example of a media feed subsystem 23 that is driven according to the present invention. The media feed subsystem 23 has a pick roller 4 and a drive roller 6. A single stepper motor (not shown) drives the rollers 4, 6 via a gear train 24 that is illustrated in dotted lines in FIG. 3A. This gear train 24 is illustrated to include a main gear 8, a free gear 12 and a delay gear 26. The stepper motor (not shown) drives the main gear 8, which in turn drives the free gear 12 and delay gear 26 to ultimately drive the drive roller 6 and pick roller 4 respectively. The ratios of the gears are selected to drive the rollers 4, 6 at the required speeds and forces. In this particular embodiment, the drive roller 6 is driven at a faster speed than the pick roller 4 to create a gap 16 between sequentially fed sheet media.

In an automatic document feeder in which this media subsystem 23 can be used, the pick roller 4 is positioned over and in constant engagement with a stack of sheet media 28 on a pressure plate (not shown). The media stack 28 is urged against the pick roller 4 by the pressure plate (not shown) to allow the pick roller 4 to separate a sheet medium on top of the media stack 28 to advance it along a document path in the automatic document feeder. The pressure plate has an idle roller (not shown) mounted thereon. In the absence of sheet medium between the pick roller 4 and the pressure plate, the pick roller 4 rides on the idle roller to relieve pressure that would otherwise build up where the pick roller meets the pressure plate.

The drive roller 6 is positioned downstream along the document path. When a sheet medium is sufficiently advanced along the document path to come under the drive roller 6, the faster drive roller 6 pulls the sheet medium as opposed to the pick roller 4 pushing the sheet medium. The pick roller 4 is driven via a slip clutch 30 (FIG. 4A) that allows the pick roller 4 to rotate or freewheel at the increased speed of the drive roller 6 when a single sheet of sheet medium simultaneously contacts both rollers 4, 6.

When attached to a scanner (not shown), the drive roller 6 advances the sheet medium over a scan zone (generally indicated by arrow X in FIG. 3A) for scanning. As previously described, there is usually insufficient memory in a low-cost scanner unit to completely capture the image on a sheet medium in a single continuous pass. This memory is a critical resource in the low-cost scanner. It has also been described that the sheet medium is divided into several contiguous sections for separate scanning. And to ensure that the scanned image is of a sufficiently high quality, the drive roller 6 is required to advance each section to be scanned across the scan zone at a substantially uniform speed. To ensure such an advancement of the sections of a sheet medium, after one section is scanned, the sheet medium is decelerated to come to a stop, reversed and forwarded to allow the sheet medium to accelerate to the substantially uniform speed when the next section reaches the scan zone. Preferably, the next section should reach the scan zone when the memory is again available.

Typically, scanning can be performed at resolutions in the range of 60–1200 dots-per-inch (dpi). The length of the sections is inversely proportional to the resolution of scanning. Scanning at the lowest resolution allows the length of the section to be the largest. In the preferred embodiment, this worst case length is about 7.8 mm.

The reversing and forwarding of the sheet medium in such an application is mandated by the recommended driving profile of the stepper motor to ensure that the stepper motor does not miss steps. Those skilled in the art would be familiar with such a stepper motor driving profile.

Figure 4A:
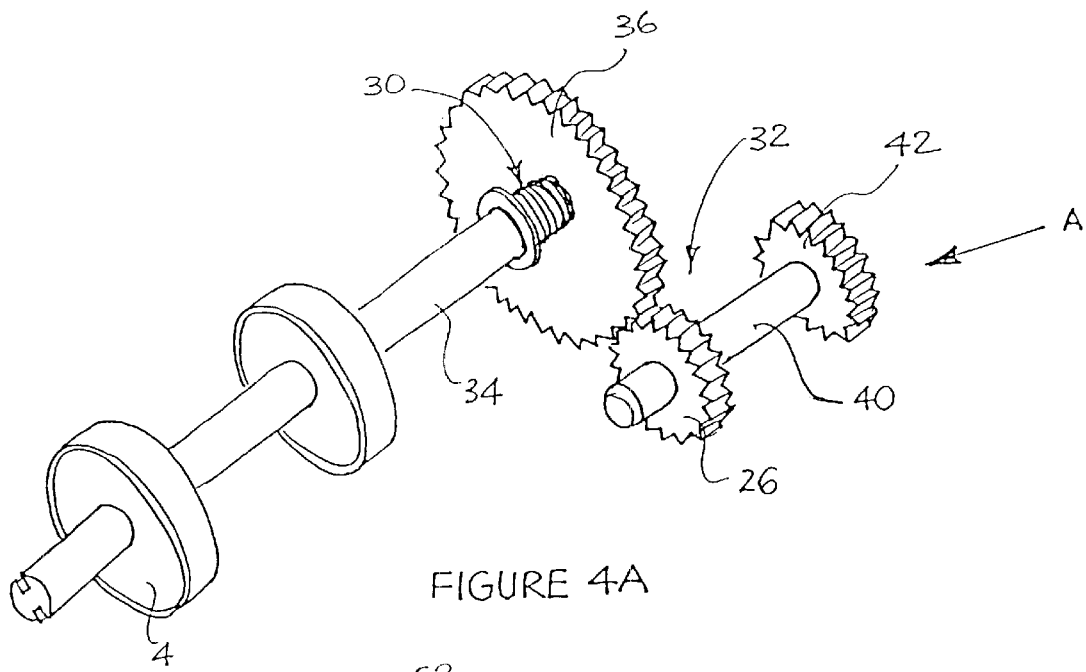
FIG. 4A is an isometric drawing of an embodiment of a pick roller on a pick roller shaft. A pick roller gear drives the pick roller shaft via a slip clutch. The delay gear of FIGS. 3A-3H is shown in engagement with the pick roller gear.

In a document feeder, it is also important to have a gap between sheet media to denote the boundary of each sheet medium. During the reversing of a sheet medium, the pick roller 4 is prevented from rotating by the slip clutch 30 (FIG. 4A). Once the sheet medium is reversed the desired distance, the drive roller 6 is again driven in the forward direction to bring a subsequent section for scanning at the scan zone. When the drive roller 6 is driven in the forward direction, the pick roller 4 is not immediately driven but only after a delay that is proportional to the distance the sheet medium is reversed. This delay allows the gap between the two sheet media prior to the reversing to be restored.

FIG. 4A is an isometric drawing of a mechanism 32 that can be used to implement the delay in the driving of the pick roller 4. FIG. 4A shows the pick roller 4 and the delay gear 26 of FIGS. 3A–3H. The pick roller 4 is mounted on a shaft 34 that is attached to a pick roller gear 36 via the slip clutch 30. The delay gear 26 meshes with the pick roller gear 36 to drive it. FIG. 4B is an exploded isometric drawing of the delay gear 26 assembly as seen from a direction according to an arrow A in FIG. 4A.

The delay gear 26 has an aperture 38 for receiving a shaft 40 that is attached to a free gear 42 (FIG. 4A). On the edge of this aperture 38 are several, preferably three, axially extending resilient arms 44. To attach the delay gear 26 to the shaft 40, the shaft 40 is inserted into the aperture defined by the resilient arms 44. In doing so, the resilient arms 44 flex radially outwards. The delay gear 26 is slipped along the shaft 40 until latching tips 46 of the resilient arms 44 are over an annular groove 48 on the shaft 40. In this position, the resilient arms 44 collapse to allow the latching tips 46 to engage the groove 48 to hold the delay gear 26 in place on the shaft 40. When in this position, a stub 50 on the shaft 40 is positioned in a gap 52 defined between two resilient arms 44 on the delay gear 26. This shaft 40 is free to rotate within boundaries defined by the gap 52 without rotating the delay gear 26. The delay gear 26 will start to rotate when the stub 50 engages blocking walls 54 that defines the boundaries of the gap 52.

The operation of this delay gear 26 for use in the current invention is next described. FIG. 3A shows the stub 50 urging against a blocking wall 54 of the delay gear 26 to drive the delay gear 26. In this figure, the delay gear 26 meshes with the pick roller gear 36 to drive the pick roller 4 to rotate it in a forward direction (arrow F) as described previously.

Figure 3B:
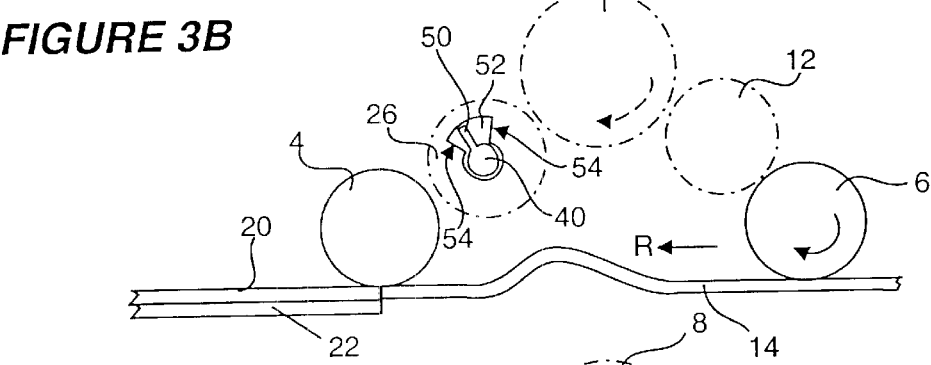
Figure 4B:
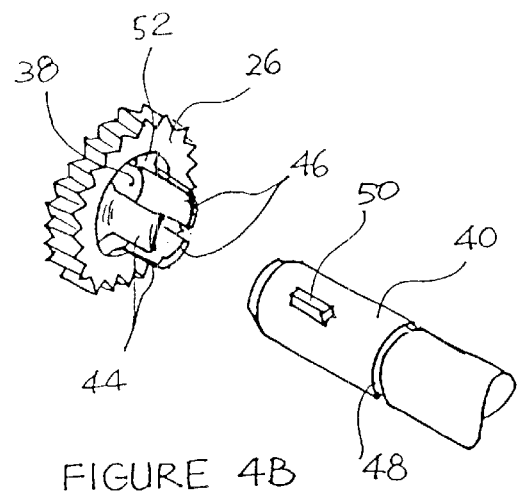
FIG. 4B is an exploded isometric drawing of the delay gear in FIG. 4A as seen in the direction of an arrow A in FIG. 4A.
Figure 4A:
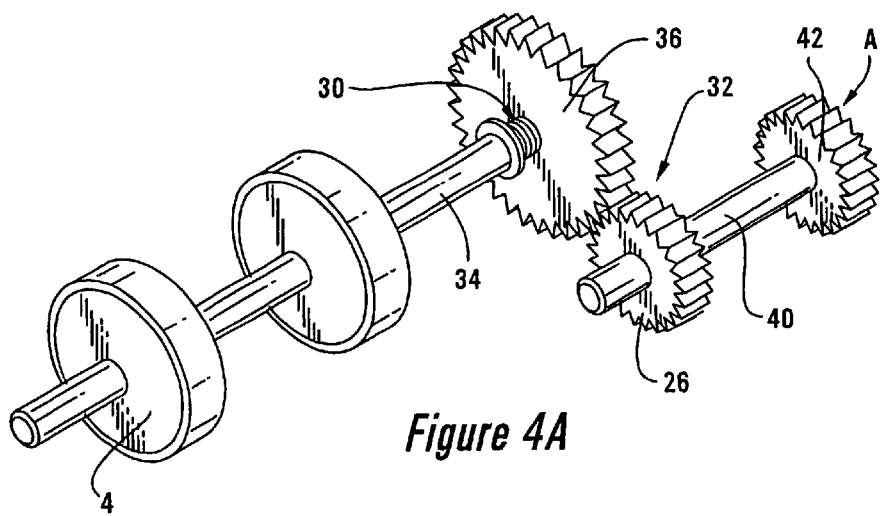
Figure 4B:
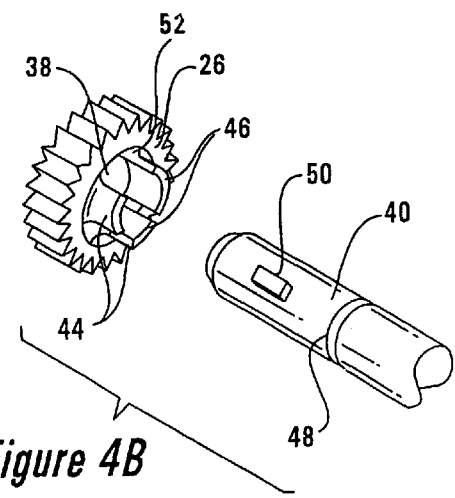

FIG. 3B shows that when the driver roller 6 is reversed, the slip clutch 30 on the pick roller shaft 34 prevents the pick roller 4 from rotating. Such an action will not cause a sheet medium 20 to be pushed from under the pick roller 4. The first sheet medium 14 that is reversed is allowed to warp. When the main gear 8 is driven to reverse the first sheet medium 14, the free gear 42 is rotated in an anti-clockwise direction. The stub 50 on the shaft 40 will move away from the blocking wall 54 without rotating the delay gear 26. The angular distance moved by the stub 50 in the gap 52 corresponds to the distance the first sheet medium 14 is reversed. The minimum length of the gap 52 should correspond to the maximum reverse distance of a sheet medium 14 under the drive roller 6. This angular distance is easily determined by those skilled in the art.

Figure 3C:
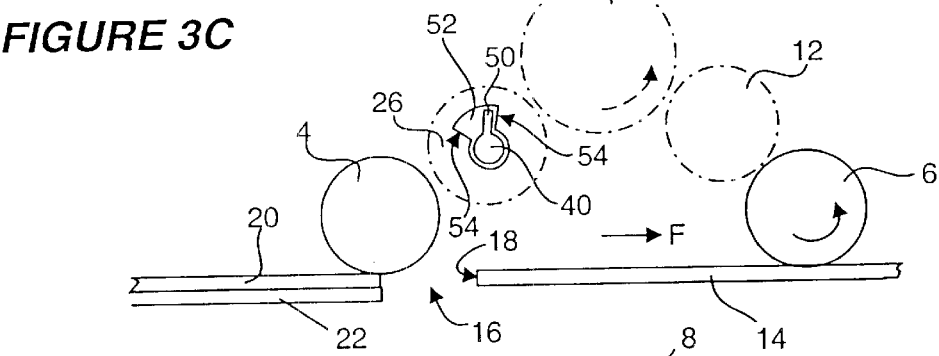

FIG. 3C shows the drive roller 6 again being driven to advance the first sheet medium 14 in the forward direction as indicated by the arrow F. The pick roller 4 remains stationary until the stub 50 again engages the blocking wall 54. This delay in driving the pick roller 4 allows the drive roller 6 to advance the first sheet medium 14 to restore the gap between the first and second sheet medium 14, 20.

Figure 3D:
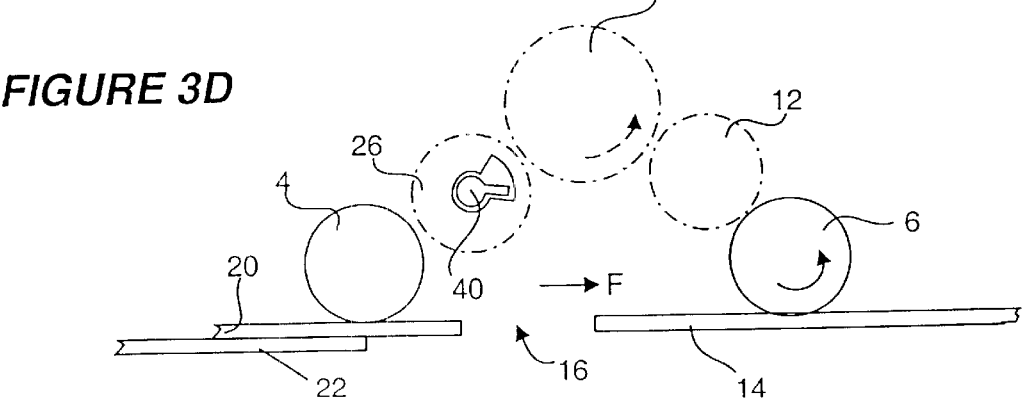
Figure 3E:
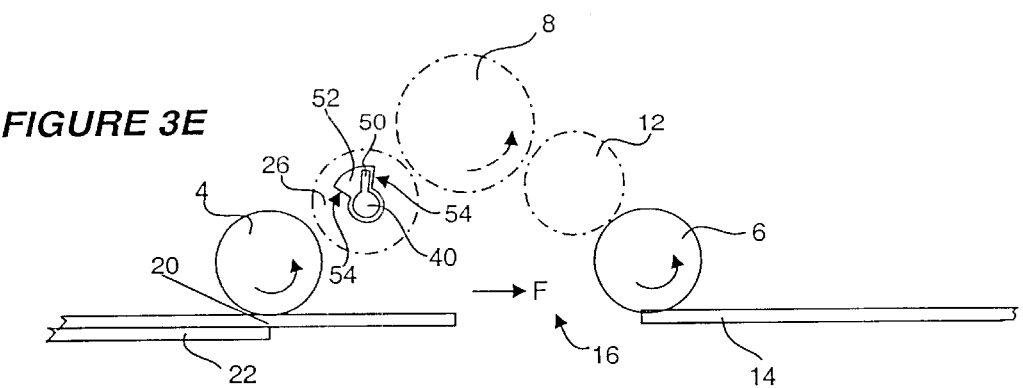

Once the stub 50 engages the blocking wall 54, the delay gear 26 is again rotated to advance the second sheet medium 20 towards the drive roller 6 as shown in FIGS. 3D and 3E. As the drive roller 6 is driven at a faster speed, the gap between the two sheet media 14, 20 widens.

Figure 3F:
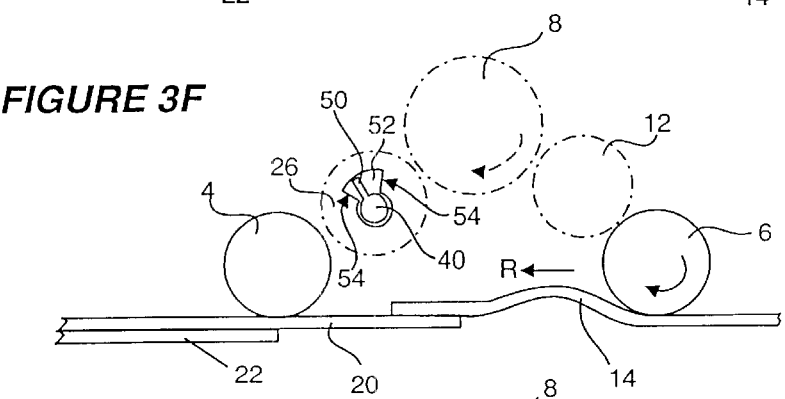
Figure 3G:
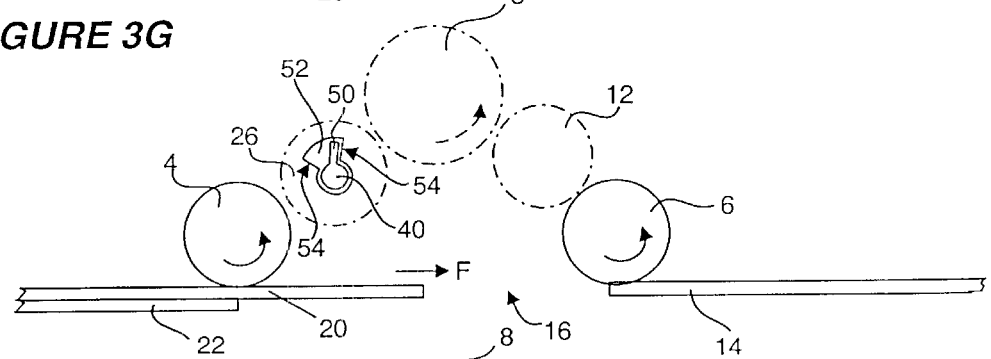

FIG. 3F shows the overlap of sheet media during the reversing of a sheet medium. However, with the delay in driving the pick roller 4 after the drive roller 6 is again driven in the forward direction, the gap between the two sheet media will again be restored as shown in FIG. 3G when the rollers are again driven in the forward direction.

Figure 3H:
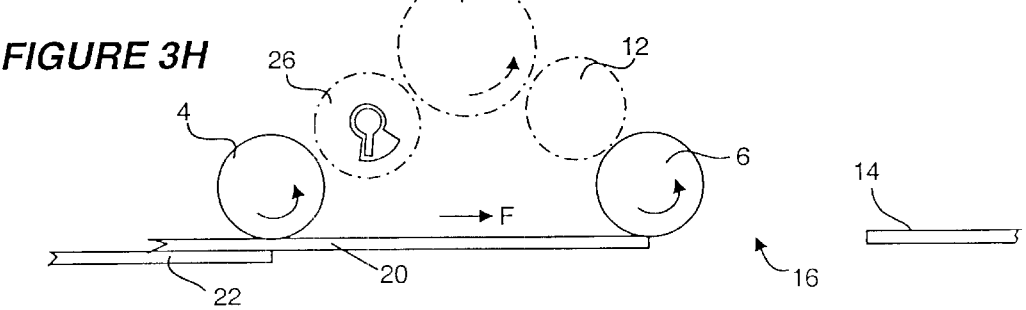

FIG. 3H shows a maximum gap width between the two sheet media when the second sheet medium reaches the drive roller 6. When the second sheet medium 20 is moved to such a position in the document path, it will be advanced and reversed in tandem with the first sheet medium 14.

The invention should not be construed to be limited to the use of the delay gear 26 as described above. Other means of introducing a delay in the driving of the pick roller 4 will be readily known to a person skilled in the art. For example, two separate motors, a pick motor and a drive motor, can be used to drive the pick and the drive rollers 4, 6 respectively. The delay is achieved by activating the pick motor after a predetermined period after the drive motor is driven.

As another example when only a single motor is used to drive both the pick and drive rollers, a free gear can be switch in and out of position to engage and disengage the pick roller gear. Such a gear can be switched by means of a solenoid.

We claim:

1. A media feed subsystem suitable for use in an automatic document feeder of a scanner, the media feed subsystem comprising:

a drive roller for advancing a sheet medium in a forward direction section-by-section across a scan zone of the scanner for scanning, each section being advanced across the scan zone at a substantially uniform speed with the drive roller being reversed after a section is scanned to reverse a sheet medium by a predetermined distance to allow the sheet medium to be accelerated to reach the substantially uniform speed when a next section reaches the scan zone;

a pick roller on a pick roller shaft for picking a next sheet medium and advancing the next sheet medium in the forward direction to follow the preceding sheet medium;

a slip clutch attached to the pick roller shaft to substantially allow unidirectional rotation of the pick roller in the forward direction so that the pick roller is substantially stationary when the drive roller is driven in the reverse direction;

a drive system for driving the drive roller and the pick roller; and a delay mechanism in the drive system to allow the pick roller to be driven in the forward direction only after the drive roller is forwarded for a predetermined period following the reversing of the drive roller.

2. A media feed subsystem according to claim 1, wherein the drive system drives the drive roller at a faster speed than the pick roller.

3. A media feed subsystem according to claim 1, wherein the drive system includes a pick motor and a drive motor for driving the pick roller and the drive roller respectively and wherein the delay mechanism in the drive system involves driving the pick motor only after the drive roller is driven in the forward direction for the predetermined period.

4. A media feed subsystem according to claim 1, wherein the drive system includes a single motor that drives the pick roller and the drive roller via a gear train and wherein the delay mechanism involves using a solenoid to switch a gear to be in and out of engagement with the gear train for driving the pick roller.

5. A media feed subsystem according to claim 1, wherein the drive system includes a single motor that drives the pick roller and the drive roller via a gear train and wherein the delay mechanism in the drive system includes:

a delay gear for driving the pick roller, and a second shaft attached to the delay gear to allow the second shaft to rotate in one direction to engageably drive the delay gear for driving the pick roller in the forward direction and to rotate in the other direction to disengage the delay gear to delay its driving by the predetermined period.

6. A media feed subsystem according to claim 5, wherein:

the delay gear has an aperture for receiving the second shaft; the delay gear further having a gap defined therein for receiving a stub that is fixedly attached on the second shaft;

whereby the second shaft is rotatable to allow the stub to move within the gap to engage and disengage the delay gear.

7. A media feed subsystem according to claim 6, wherein the delay gear further includes a plurality of axially extending arms that has latching tips and wherein the second shaft further includes an annular groove;

whereby the latching tips engages the annular groove to hold the delay gear in place when the delay gear is attached to the second shaft.

8. A system for advancing sheet media comprising:

means for advancing a first sheet medium and a second sheet medium to follow the first sheet medium with a predetermined gap therebetween;

means for intermittently reversing the first sheet medium for a predetermined distance during advancing of the first sheet medium; and means for preventing reversing of the second sheet medium during reversing of the first sheet medium and for allowing advancing of the second sheet medium only a predetermined period after the first sheet medium is advanced following reversing to thereby maintain the predetermined gap between the first and the second sheet media.

9. A system according to claim 8, wherein means for advancing includes means for advancing the first sheet medium section by section across a predetermined zone at a predetermined speed, and wherein means for intermittently reversing includes means for intermittently reversing the first sheet medium a predetermined distance after the advancing means advances a first section across the predetermined zone to back up the first sheet medium sufficiently so that the advancing means can subsequently advance a second section subsequent to the first section by accelerating the first sheet medium to reach the predetermined speed for the second section to be advanced across the predetermined zone at the predetermined speed.

10. A system according to claim 9, wherein the predetermined zone includes a scan zone of a scanner.

11. A system according to claim 8, wherein the means for intermittently reversing the first sheet medium for a predetermined distance includes means for intermittently reversing the first sheet medium for a predetermined distance to overlap the second sheet medium.

12. A system according to claim 11, wherein:

the advancing means and reversing means include:

a pick roller on a pick roller shaft for picking and advancing the first and the second sheet media; and a drive roller for further advancing the sheet media advanced by the pick roller; and the preventing means includes:

a slip clutch attached to the pick roller shaft for allowing unidirectional rotation of the pick roller; and a delay mechanism associated with the pick roller to delay rotation of the pick roller for the predetermined period.

13. A system according to claim 12, wherein the pick roller freewheels when the drive roller is driver at a faster speed than the pick roller.

14. A system according to claim 12, wherein the delay mechanism includes:

a delay gear for driving the pick roller; and a second shaft attached to the delay gear to allow the second shaft to rotate in one direction to engageably drive the delay gear for driving the pick roller to advance the sheet media and to rotate in the other direction for a predetermined disengaged distance corresponding to the predetermined period without rotating the pick roller.

15. A system according to claim 14, wherein the delay gear has an aperture for receiving the second shaft, the delay gear further having a gap defined therein for receiving a stub that is fixedly attached to the second shaft; the second shaft being rotatable to allow the stub to move within the gap to engage and disengage the delay gear.

16. A system according to claim 15, wherein the delay gear further includes a plurality of axially extending arms having latching tips for engaging an annular groove on the second shaft.

17. A system according to claim 11, wherein:

the advancing means and reversing means include:
  a pick roller on a pick roller shaft for picking and advancing the first and the second sheet media;
  a drive roller for further advancing the sheet media advanced by the pick roller;
  a pick motor for driving the pick roller; and
  a drive motor, separate from the pick motor, for driving the drive roller; and the preventing means include means for stopping the pick motor during reversing of the first sheet medium and for driving the pick motor to advance the second sheet medium after the predetermined period.

18. A system according to claim 11, wherein:

the advancing means and reversing means include:
  a pick roller on a pick roller shaft for picking and advancing the first and the second sheet media;
  a drive roller for further advancing the sheet media advanced by the pick roller; and
  a motor for driving the pick roller and the drive roller via a gear train; and the preventing means include a gear in the gear train switchable to be in and out of engagement with other gears in the gear train to drive and stop the pick roller respectively.

\* \* \* \* \*

UNITED STATES PATENT AND TRADEMARK OFFICE
CERTIFICATE OF CORRECTION

PATENT NO. : 6,446,954 B1
DATED : September 10, 2002
INVENTOR(S) : Kian Soon Lim and Cher Lam Lim It is certified that error appears in the above-identified patent and that said Letters Patent is hereby corrected as shown below:

Drawings,
The informal drawings on Figures 4A and 4B on Sheet 4 of 4 should be replaced with the enclosed formal drawings Signed and Sealed this Eleventh Day of March, 2003

JAMES E. ROGAN
*Director of the United States Patent and Trademark Office*